United States Patent [19]

Strobel

[11] Patent Number: 4,589,749
[45] Date of Patent: May 20, 1986

[54] CAMERA VIEWFINDER

[75] Inventor: Joseph R. Strobel, Stuttgart, Fed. Rep. of Germany

[73] Assignee: Eastman Kodak Company, Rochester, N.Y.

[21] Appl. No.: 709,853

[22] Filed: Mar. 8, 1985

[30] Foreign Application Priority Data

Jun. 7, 1984 [DE] Fed. Rep. of Germany ....... 3421214

[51] Int. Cl.$^4$ ............................................. G03B 13/14
[52] U.S. Cl. .................................................. 354/221
[58] Field of Search ............... 354/199, 219, 221, 224, 354/225; 352/171

[56] References Cited

U.S. PATENT DOCUMENTS 3,393,623  7/1968  Gutmann et al. .................... 354/221

FOREIGN PATENT DOCUMENTS

P39710   10/1950  Fed. Rep. of Germany .
1210317   2/1966  Fed. Rep. of Germany .
1522180   1/1979  Fed. Rep. of Germany .
7912056   7/1979  Fed. Rep. of Germany .
2938449   4/1980  Fed. Rep. of Germany .
207729    3/1940  Switzerland .

Primary Examiner—L. T. Hix
Assistant Examiner—Brian W. Brown
Attorney, Agent, or Firm—Roger A. Fields

[57] ABSTRACT

A viewfinder for a camera includes a near-subject frame visible in the finder field to frame subjects closer to the camera than a predetermined distance, e.g., four feet, and a normal frame visible in the finder field to frame subjects beyond that distance. The near-subject frame defines a subject-field that is offset from the subject-field defined by the normal frame to correct for the parallax error at close distances. A focus-setting device for the camera lens has a near-subject setting for close-up subjects and a distant-subject setting for other subjects. When the focus-setting device is set to its distant-subject setting, for use with the normal frame, the near-subject frame is not visible. This prevents the near-subject frame from being confused with the normal frame. The near-subject frame is only made visible in response to the focus-setting device being set to its near-subject setting. Making the near-subject frame visible alerts the photographer to use that frame instead of the normal frame.

10 Claims, 3 Drawing Figures

CAMERA VIEWFINDER

BACKGROUND OF THE INVENTION

1. Field of the Invention

The invention relates generally to camera viewfinders for viewing and framing the subject to be photographed, and particularly to a bright-line viewfinder, sometimes called a brillant-frame finder. More specifically, the invention relates to a viewfinder having a near-subject (or parallax correction) frame and a distant-subject frame visible in the finder field to frame respective subjects closer to and farther from the camera than a predetermined distance, e.g., four feet.

2. Description of the Prior Art

When taking a picture it is necessary to know not only in what direction to aim the camera but also how much of the scene will be included in the picture. For this reason practically every modern camera has a viewfinder of some kind.

Most modern cameras include an optical viewfinder which comprises a negative finder lens, and a positive eyelens mounted behind the negative lens, for viewing an erect image of the subject to be photographed. The limits of the field of view in the finder may be masked on the negative lens, and the scene is viewed through the finder with the camera held at eye level. In one popular viewfinder, known as the Albada finder, the concave curve on the negative lens is made partially reflective with a metalized coating, such as aluminum. The coating reflects a white frame defined by a series of rectangularly arranged slots in a black mask which surrounds the eyelens. The photographer sees the white frame as suspended in space superimposed over the scene viewed through the finder. The white frame surrounds the portion of the field of view in the finder which will be projected on the film.

A more recent viewfinder somewhat similar to the Albada finder is the bright-line or brilliant-frame finder. In this viewfinder, a second window is provided adjacent the finder window. The second window is covered with a diffusing screen, and the rectangular series of slots is cut into a masking plate situated behind the screen. A prism or mirror behind the masking plate reflects a bright-line frame, formed by ambient light in the slots, onto a semi-reflecting mirror in the viewing path of the finder, and from there into the positive eyelens. This arrangement provides a brighter frame for the viewed subject as compared to the Albada finder.

When the viewfinder, even though pointing in the same direction as the camera lens, takes in a field of view that is displaced relative to the view projected on the film, it suffers from a framing error. This is commonly referred to as the parallax error. It arises from the difference in viewpoint between the viewfinder and the camera lens, which may be one to two inches apart. With a distant subject which may have a subject-field of many feet or even yards, an inch or two is obviously insignificant. At close range, however, for instance with the camera lens focused at three feet, the subject-field may only be two to three feet wide. There, a couple of inches lost at the top of the scene may result in the cutting off of important subject matter. For this reason many cameras include some means for correcting for parallax in the finder.

There are various ways of compensating for the framing error due to the finder parallax. The simplest is to cut down the finder field so that it always takes in less than the film. With distant subjects, the view projected on the film will then include more at the top than in the finder field, while at near distances there will be more recorded at the bottom of the picture than in the finder field. This solution is less than satisfactory since the photographer cannot be sure of the actual extent to which the subject-field will be recorded on the film.

Bright-line finders usually have one of two types of correction for parallax. The simplest is a second bright-line frame that defines a subject-field which includes slightly more at the bottom and one side, with a corresponding reduction at the top and the other side, as compared to the subject-field defined by the normal bright-line frame. Thus, the second bright-line frame serves as a parallax correction frame for framing close-up subjects nearer to the camera lens than say four feet, and the normal bright-line frame is used to frame other subjects beyond that distance. In operation, the normal frame is used far more frequently than the parallax correction frame.

Often, in bright-line finders having a parallax correction frame for framing close-up subjects and a normal frame for framing other subjects, the two frames are illuminated by ambient light in the viewing path, and therefore are both visible in the finder field at the same time. This may cause the photographer to confuse the parallax correction frame with the normal frame, or vice versa, especially when picture-taking must be done quickly.

More advanced cameras have a bright-line finder in which a single bright-line frame is alternatively located in a normal position for most subjects and in a parallax compensation position for close-up subjects. Thus, only a single bright-line frame is ever visible in the finder. Typically, the mask for producing the bright-line frame is coupled to the focusing mechanism for the camera lens. This allows the bright-line frame to be shifted in the finder field to the appropriate position in accordance with the focus position of the camera lens. However, this arrangement is relatively complex from a mechanical standpoint, and therefore increases the manufacturing cost of the camera and the possible risk of a break-down.

SUMMARY OF THE INVENTION

The above-described problems relating to viewfinders are believed solved by the invention. According to the invention there is provided an improved, yet relatively simple, viewfinder for a camera. The viewfinder includes a near-subject frame visible in the finder field to frame subjects closer to the camera than a predetermined distance, e.g., four feet, and a normal frame visible in the finder field to frame subjects beyond that distance. The near-subject frame defines a subject-field that is offset from the subject-field defined by the normal frame to correct for the parallax error at close distances. A focus-setting device for the camera lens has a near-subject setting for close-up subjects and a distant-subject setting for other subjects. When the focus-setting device is set to its distant-subject setting, for use with the normal frame, the near-subject frame is not visible. This prevents the near-subject frame from being confused with the normal frame. The near-subject frame is only made visible in response to the focus-setting device being set to its near-subject setting. Making the near-subject frame visible alerts the photographer to use that frame rather than the normal frame.

In keeping with the teachings of the invention, the normal frame may be made visible by ambient light in the viewing path of the finder which is reflected from the subject to be photographed. In contrast, the near-subject frame can only be made visible by artificial or ambient light directed from a location in the finder that is outside the viewing path. Such an arrangement is relatively simple and easy to manufacture as compared to the movable frame-mask described in connection with the prior art.

In a preferred embodiment of the invention, a partially-reflecting mirror is disposed to transmit ambient light in the viewing path of the finder and to form respective images of the near-subject and normal frames by reflection. With such a mirror, it is possible to view a close-up or distant subject through the mirror with a frame image surrounding the viewed subject in superimposed relation. The near-subject and normal frames are supported on a common optical support, e.g., an eyelens, in the viewing path, and have respective partially-reflecting surfaces through which a close-up or distant subject may be viewed. The normal frame is positioned to reflect ambient light in the viewing path toward the mirror to cause a bright-line image of the frame to be formed by the mirror. The near-subject frame is positioned to reflect ambient light in the viewing path toward a location spaced from the mirror to prevent an image of that frame from being formed by the mirror. A light source, energizable in response to the focus-setting means being set to its near-subject setting, directs source light from outside the viewing path toward the near-subject frame, and from there the light is reflected toward the mirror to cause a bright-line image of the frame to be formed by the mirror. Thus, the near-subject frame can only be made visible in the finder by source light outside the viewing path, whereas the distant-subject frame is made continuously visible in the finder by ambient light in the viewing path.

BRIEF DESCRIPTION OF THE DRAWINGS

The invention will be described in connection with the drawings, wherein.

DESCRIPTION OF THE PREFERRED EMBODIMENT

The invention is described as being embodied in a 35 mm still camera. Because such photographic cameras are well known, this description is directed in particular to camera elements forming part of or cooperating directly with the preferred embodiment. It is to be understood, however, that camera elements not specifically shown or described may take various forms known to persons of ordinary skill in the art.

Figure 3:
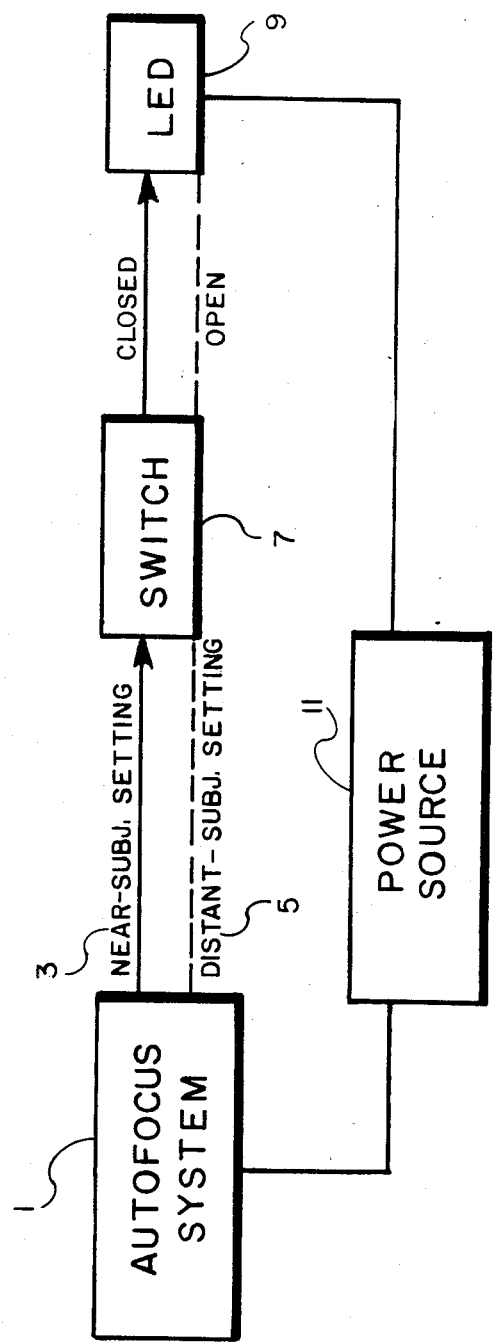
FIG. 3 is a block diagram for use in describing the operation of the viewfinder.

Referring now to the drawings, FIG. 3 depicts focus-setting means for a camera lens as an autofocus system 1. The autofocus system 1 is a known type having a near-subject setting 3 for subjects closer to the camera lens than a predetermined distance, e.g., four feet, and a distant-subject setting 5 for subjects farther from the camera lens than the predetermined distance. When the autofocus system 1 is in its near-subject setting 3, a normally opened switch 7 is closed to energize a light-emitting diode (LED) 9 via a suitable power source 11. Conversely, when the autofocus system 1 is in its distant-subject setting 5, the switch 7 remains opened and the LED 9 is not energized.

Figure 1:
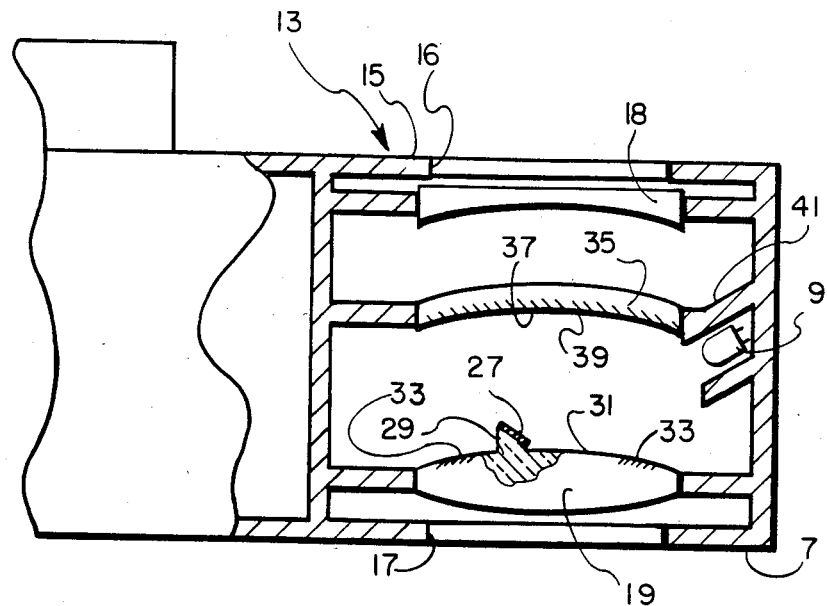
FIG. 1 is a plan view, partially in section, of a viewfinder according to a preferred embodiment of the invention.
Figure 2:
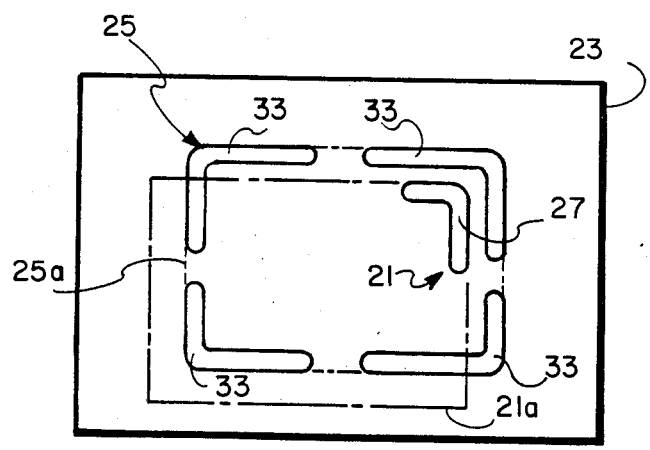
FIG. 2 is an elevation view of the field of view of the viewfinder.

A bright-line viewfinder 13, sometimes called a brilliant-frame finder, is shown in FIG. 1. A finder housing 15 having opposite end openings 6 and 17 encloses a plano-convex negative finder lens 18 and a biconvex positive eyelens 19. The two lenses 18 and 19 are optically aligned in a viewing path to view an erect image of a subject to be photographed. As shown in FIG. 2, the viewfinder includes a near-subject frame 21 visible in the finder field 23 to frame a subject closer to the camera lens than the predetermined distance, i.e., four feet; and a distant-subject frame 25 visible in the finder field to frame a subject farther from the camera lens than the predetermined distance. The distant-subject frame 25 is depicted in FIG. 2 as four discrete frame sections which define a rectangular area 25a, i.e., a subject-field, in the finder field 23. In a simpler sense, the near-subject frame 21 is depicted in FIG. 2 as a single frame section which defines a rectangular area 21a in the finder field 23. The rectangular area 21a is slightly offset from the rectangular area 25a to compensate for the parallax error at close distances. As shown in FIG. 2, the rectangular area 21a includes slightly more at the bottom and the left side, with a corresponding reduction at the top and the right side, as compared to the rectangular area 25a. The near-subject frame 21 is defined by a single partially-reflecting surface 27 coated on the inclined top of a raised portion 29 of the rear convex side 31 of the positive eyelens 19. The distant-subject frame 25 is defined by four partially-reflecting surfaces 33 coated on the rear convex side 31 of the eyelens 19. Since the respective frame surfaces 27 and 33 are partially reflecting, they will transmit ambient light in the viewing path, and therefore will not obscure the viewed subject in the finder field 23.

As shown in FIG. 1, the near-subject frame 21 and the distant subject frame 25 are located on a common optical support, i.e., the eyelens 19. This permits a relatively compact viewfinder to be designed.

Partially-reflecting mirror means in the finder housing 15 is shown in FIG. 1 as a curved glass mirror 35 which has a concave curved side 37 coated with a partially-reflecting surface 39. The mirror 35 is disposed in the viewing path of the finder 13 to transmit ambient light in the path and to form respective images of the partially-reflecting surfaces 27 and 33 of the near-subject and distant-subject frames 21 and 25. With such an arrangement, it is possible to view a close-up or distant subject through the mirror 35 with a frame image surrounding the viewed subject in superimposed relation. The four partially-reflecting surfaces 33 defining the distant-subject frame 25 are positioned in the viewing path to reflect ambient light in the path toward the partially-reflecting surface 39 of the mirror 35. This will cause a bright-line image of that frame to be formed by the mirror whenever ambient light is in the viewing path. The single partially-reflecting surface 27 defining the near-subject frame 21 is positioned in the viewing path to reflect ambient light in the path toward a location spaced from the partially-reflecting surface 39 of the mirror 35. Thus, an image of that frame normally will be prevented from being formed by the mirror.

The LED 9 is positioned in the finder housing 15 within a light shield 41 to direct artificial light (when energized) from outside the viewing path toward the partially-reflecting surface 27 defining the near-subject frame 21, and from there toward the partially-reflecting surface 39 of the mirror 35, to cause a bright-line image of the frame to be formed by the mirror. As described above, the LED 9 is only energized in response to the autofocus system 1 being set to its near-subject setting 3 for a close-up subject.

OPERATION

During normal operation of the viewfinder 13, the autofocus system 1 is set to its distant-subject setting 5, and the distant-subject frame 25 is made visible in the finder field 23 by ambient light in the viewing path. Since the LED 9 is not energized, the near-subject frame 21 is not visible in the finder field 23 (even though that frame is illuminated by ambient light in the viewing path).

When, on occasion, the autofocus system 1 is set to its near-subject setting 3, the LED 9 is energized to make the near-subject frame 21 visible in the finder field 23. Making the near-subject frame 21 visible alerts the photographer to use that frame instead of the visible distant-subject frame 25.

While the invention has been described with reference to a preferred embodiment, it will be understood that various modifications may be effected within the ordinary skill in the art without departing from the scope of the invention. For example, instead of providing the LED 9 for directing artificial light from outside the viewing path to cause a bright-line image of the near-subject frame 21 to be formed by the mirror 35, a shutter and optical fiber may be provided for directing ambient light from outside the viewing path for the same purpose.

Instead of employing the autofocus system 1, a manually operated focusing mechanism may be used. The focusing mechanism could be a known type having a scale of distances or zones marked on it. When a particular distance or zone is opposite the scale reference arrow, the camera lens is focused on all objects at that distance or within that zone.

If an automatic focusing mechanism is used, as in the preferred embodiment, a visual indicator may be provided to alert the photographer that the mechanism is set to its near-subject setting. The indicator serves as further means, in addition to the visible near-subject frame 21, for alerting the photographer to use that frame rather than the visible distant-subject frame 25. The indicator might, for example, comprise an optical fiber extending between the LED 9 and an exterior location on the finder housing 15.

I claim:

1. In a camera of the type wherein a viewfinder includes (a) a near-subject frame for framing a subject closer to said camera than a predetermined distance and (b) a distant-subject frame for framing a subject farther from the camera than the predetermined distance, and wherein focus-setting means has (a) a near-subject setting corresponding to the closer subject and (b) a distant-subject setting corresponding to the farther subject, the improvement comprising:

partially-reflecting mirror means, disposed to form respective images of said near-subject and distant-subject frames by reflection, for viewing a closer or farther subject through said mirror means with a frame image surrounding the viewed subject;

means defining a path for light;

means positioning said distant-subject frame for illumination by light in said path to make the frame visible for reflection by said mirror means whenever said focus-setting means is set to its near-subject or distant-subject setting;

means for preventing light in said path from making said near-subject frame visible for reflection by said mirror means; and means, responsive to said focus-setting means being set to its near-subject setting, for directing light outside said path to illuminate said near-subject frame and make the frame visible for reflection by said mirror means.

2. The improvement as recited in claim 1, wherein said partially-reflecting mirror means is disposed to transmit light reflected from a subject to view the subject, and said light path defining means provides said path for light transmitted by the mirror means.

3. The improvement as recited in claim 1 or 2, wherein said preventing means permits light in said path to illuminate said near-subject frame but reflects light in the path, falling on the frame, toward a location spaced from said mirror means to prevent said frame from being reflected by the mirror means.

4. In a camera of the type wherein a viewfinder includes (a) a near-subject frame visible in the finder field to frame a subject closer to said camera than a predetermined distance and (b) a distant-subject frame visible in the finder field to frame a subject farther from the camera than the predetermined distance, and wherein focus-setting means has (a) a near-subject setting corresponding to the closer subject and (b) a distant-subject setting corresponding to the farther subject, the improvement comprising:

means positioning said distant-subject frame for illumination by ambient light in said viewfinder to make the frame visible in the finder field whenever said focus-setting means is set to its near-subject or distant-subject setting;

means for preventing ambient light in said viewfinder from making said near-subject frame visible in the finder field; and illumination source means, responsive to said focus-setting means being set to its near-subject setting, for illuminating said near-subject frame to make the frame visible in the finder field.

5. In a camera of the type wherein a viewfinder includes (a) a near-subject frame for framing a subject closer to said camera than a predetermined distance and (b) a distant-subject frame for framing a subject farther from the camera than the predetermined distance, and wherein focus-setting means has (a) a near-subject setting corresponding to the closer subject and (b) a distant-subject setting corresponding to the farther subject, the improvement comprising:

optical means defining a path for light reflected from a closer or farther subject;

partially-reflecting mirror means, disposed to transmit light in said path and to form respective images of said near-subject and distant-subject frames by reflection, for viewing a closer or farther subject through said mirror means with a frame image surrounding the viewed subject;

means positioning said distant-subject frame in said path, and with respect to said mirror means, for causing an image of the frame to be formed by the mirror means whenever light is in the path;

means positioning said near-subject frame in said path, though with respect to said mirror means for preventing light in the path from causing an image of the frame to be formed by the mirror means; and means, responsive to said focus-setting means being set to its near-subject setting, for directing light outside said path toward said near-subject frame to cause an image of the frame to be formed by said mirror means.

6. The improvement as recited in claim 5, wherein said near-subject frame is partially reflecting to transmit light in said path, reflected from a farther subject, to view the farther subject through the frame.

7. The improvement as recited in claim 6, wherein said near-subject frame is positioned to reflect light in said path, reflected from a closer or farther subject, toward a location spaced from said mirror means to prevent an image of the frame from being formed by the mirror means and is positioned to reflect light outside said path, directed by said light directing means, toward said mirror means to cause an image of said frame to be formed by the mirror means.

8. The improvement as recited in claim 7, wherein said distant-subject frame is partially reflecting and is positioned to reflect light in said path toward said mirror means to cause an image of the frame to be formed by the mirror means.

9. The improvement as recited in claim 8, wherein said respective positioning means for said near-subject and distant-subject frames include a common optical support for the frames.

10. The improvement as recited in claim 9, wherein said optical support is a positive eyelens, and said mirror means is a partially-reflecting coating on a concave curved side of a negative finder lens.

* * * * *